United States Patent [19]

Hayase et al.

[11] 4,298,391

[45] Nov. 3, 1981

[54] HOT REPAIR GUN REFRACTORY MIX FOR A LINING REFRACTORY

[75] Inventors: Masahiro Hayase; Hiroyuki Sugimoto; Mitsuteru Takemoto, all of Okayama, Japan

[73] Assignee: Shinagawa Refractories Co., Ltd., Tokyo, Japan

[21] Appl. No.: 108,677

[22] Filed: Dec. 31, 1979

[30] Foreign Application Priority Data

Apr. 19, 1979 [JP] Japan ................................. 54-47216

[51] Int. Cl.³ ............................................. C04B 35/52
[52] U.S. Cl. ........................................ 501/89; 501/90; 501/119
[58] Field of Search ........................... 106/56; 428/403

[56] References Cited

U.S. PATENT DOCUMENTS

| 2,978,351 | 4/1961 | Pullar | 428/403 |
| 3,026,568 | 3/1962 | Moar | 428/403 |
| 3,352,702 | 11/1967 | Leitner et al. | 106/56 |

FOREIGN PATENT DOCUMENTS 52-2006714 1/1977 Japan ..................................... 106/56

*Primary Examiner*—James Poer
*Attorney, Agent, or Firm*—Birch, Stewart, Kolasch & Birch

[57] ABSTRACT

A hot repair gun refractory mix which comprises a granulated material which is preformed by covering the surface of a carbonaceous substance particle with a fine refractory powder.

12 Claims, No Drawings

HOT REPAIR GUN REFRACTORY MIX FOR A LINING REFRACTORY

BACKGROUND OF THE INVENTION

The present invention relates to a hot gun repair refractory mix for a lining refractory. More particularly, the present invention relates to a hot gun repair refractory mix for a lining refractory in a refractory furnace such as a basic oxygen furnace, argon oxygen decarburization converter, electric arc furnace and the like and in trough running a molten pig iron, hot torpedo car and the like. Hereinafter the hot gun repair refractory mix is called a "gunning material".

Heretofore, it has been known that the penetration of a slag, molten iron, molten steel and the like into a structure of a refractory material can be defended effectively by the use of carbon.

Recently, the hot gunning repair utilizing a carbon bond has been considerably practiced in a steel manufacturing furnace such as a basic oxygen furnace, an argon oxygen decarburization convertor, an electric arc furnace and the like, where by a remarkable effect can be obtained.

As an example of a substance formed with a carbon bond, hitherto, there has been used organic resin such as tar pitch, petroleum pitch and phenol resin.

Generally, a typical composition of the well known hot repair gun refractory utilizing a carbon bond consists of coarse refractory particles, refractory fine powder, pitch and binder.

As an example, of a gunning material there is proposed a refractory composition (mostly a material to be gunned) including substantially non-acid refractory granules, 2 to 12% by weight of solid pitch granules having a softening point of 200° F. (about 93.3° C.) at least and having such granule diameter that substantially all the amount passed through a 4-mesh sieve and a substantial amount is retained on a 100-mesh sieve, 0.05 to 4% by weight of a plasticizer and 0.5 to 5% by weight of a water-soluble cold setting bonding component. However, there are defects that the solid pitch is so comparatively fine as to be melted by the furnace heat within a very short time and therefore the gunned material deposited on the furnace wall will flow away together with the molten pitch before being sintered.

As another example of a gunning material, there is proposed a gunning material which is gunned by a normally used dry-gun. The refractory granules are covered on the surface with a high melting point pitch and have less than several % by weight of a pitch of the same. The granules are mixed with less than several % by weight of the pitch of same quality granulated to a diameter of 0.3 to 2.0 mm. However, there are defects in that the steps of covering the granules with the pitch and granulating are required and the above steps are complicated and elevate the cost.

Even if these various proposals are utilized, however, there are the following points in question:

(1) smoke emitting is so much that the practice of these proposals is difficult, (2) the slurry viscosity cannot be obtained, the abhesive rate is decreased, and (3) the enrichment of carbon is limited.

Namely, the temperature within the furnace in the gunning operation is about 400° C. to 1000° C. and consequently smoke emission is considerable and the gunning practice is remarkably difficult. By the covering of the pitch on the fine granule of refractory, furthermore, the defects that the wetting of the fine granule with water, the adhesive rate is decreased and the life of the hot repair gun-operated portion cannot be sufficiently exhibited are considered.

As a result of making various examinations and research on the above-mentioned problems and on the elimination of said defects, the present inventors have succeeded in obtaining a gunning material wherein the granulated material obtained by covering of the refractory fine powder on the surface of the carbonaceous particle is mixed.

Namely, the main object of the present invention is to provide a gunning material having carbon granule-carbon bond wherein the penetration of slag, molten pig iron and molten steel into the lining rafractory is inhibited and the life of the hot repair gun-operated portion is considerably increased.

A further object of the present invention is to provide a gunning material wherein the smoke emission at the gunning operation time is nothing, the rebound loss is little and a minute structure is formed.

Therefore, the subject matter of the present invention is directed to a hot gun repair refractory mix characterized by comprising a granulated material which is preformed by covering the surface of carbonaceous substance particles with a fine powder of refractory.

DETAILED DESCRIPTION OF THE INVENTION

The present invention shall be explained in detail in the following.

The gunning material of the present invention is produced, for example, by mixing to a coated and granulated material obtained for example by mixing an aqueous solution of inorganic binder such as a phosphate in a desired ratio with a carbonaceous substance particle having a grain size of 1 to 5 mm diameter by grinding a well known high softening pitch and also by mixing a fine powder of a refractory such as magnesia clinker having a grain size of less than 0.7 mm, or to a coated and granulated material obtained for example by impregnating the aqueous solution of inorganic binder into a carbonaceous substance particle and then by mixing a fine powder of refractory thereto in a wet state, with a refractory aggregate such as a well known magnesia clinker and a fine powder for forming a matrix portion and a binding plasticizer.

The carbonaceous substance particle which is used in the present invention is a petroleum or coal pitch particle having a high softening point of 200° to 300° C. and containing more than 60% by weight of carbon residue, or a coated particle containing more than 60% by weight of fixed carbon and 5 to 40% by weight of resin content, or a petroleum or coal coke containing 5 to 20% by weight of resin content obtained by calcining at a temperature of 300° to 600° C., or a coke particle impregnated with 5 to 20% by weight of pitch, phenol resin and the like.

It is necessary that the carbonaceous substance particle contains 5 to 40% by weight of resin. If the resin content is less than 5% by weight, the carbon bond is difficult to form in the gunning material and the life of it cannot be expected because the carbon is scattered in the gunning material.

The carbonaceous substance particle is extensively used in a grain size of about 1 to 5 mm diameter. The specific surface area of carbonaceous substance particle containing the particle of grain size of less than 1 mm diameter in much quantity is increased, the quantity of fine powder of refractory is increased in more than necessary amount so that it was not preferable. The carbonaceous substance particle containing the particle of grain size of more than 5 mm diameter is also not preferable because the rebound loss of the gunning material is increased in the grading of particle of gunning material.

The fine powder of refractory which is used for the covered and granulated substance of the present invention has the function and effect that the surface of the carbonaceous substance particle is covered with the fine powder, the smoke emission at the time of the gunning operation and the difference between the specific gravity of the gun material and that of the aggregate of refractory is minimized, whereby a proper dynamic energy is obtained and also the dispersion of the gunning material is decreased. By covering the fine powder of refractory on the carbonaceous substance particle and granulating the covered substance, the wetting of the covered and granulated material with water becomes good and the covered and granulated material has a function for forming a close united structure of the covered and granulated material with matrix. As said fine powder of refractory, dolomite, magnesia, alumina, mullite and high alumina and the recovery of these disused refractories are utilized. The grain size of the fine refractory powder is preferably a degree of less than 0.7 mm diameter and the fine refractory powder having a grain size of less than 0.149 mm is largely contained so as to be uniformly covered on the surface of the carbonaceous substance particle.

The water-soluble inorganic binder which is used in the present invention is a substance in which the carbonaceous substance particle can be firmly bound with the covered and granulated material of fine powder of refractory and simultaneously a strongly covered and granulated material can be produced, thereby the grinding of carbonaceous substance particle at the time of producing the gunning material is inhibited. As said water-soluble binder, phosphoric acid, aluminium phosphate, ammonium phosphate, alkali metal phosphate, alkali metal silicate, ammonium borate, alkali metal borate, magnesium sulphate and aluminum chloride can be used in the form of an aqueous solution.

The compounding ratio of the carbonaceous substance particle to the fine powder of refractory in the covered and granulated material can be suitably varied according to the purpose of its use. The compounding ratio is preferably about 30 to 200 parts by weight of the fine powder of refractory to 100 parts by weight of the carbonaceous substance particle. If the quantity of fine powder of refractory is less than 30 parts by weight, the carbonaceous substance particle cannot be uniformly covered with the fine powder of refractory and if the quantity is more than 200 parts by weight the life becomes poor.

In the above covered and granulated material a well known refractory aggregate, a fine powder of matrix and a well known binder are suitably added so as to satisfy its use.

As examples of the aggregate and fine powder of refractory, one or more of magnesia clinker, dolomite clinker, alumina, mullite and silicon carbide which are ground to a grain size of about less than 5 mm can be used according to its use.

The compounding ratio of the covered and granulated material to the gunning material of the present invention is suitably 5 to 70% by weight. If the ratio is more than 70% by weight, the quantity of fine powder is insufficient, the rebound loss is increased and the adhesive rate at the time of gunning operation is decreased. If the rate is less than 5% by weight, the carbon bond is not formed and the characteristic life cannot be developed.

As examples of binding plasticizer there are mentioned sodium silicate powder, phosphates such as sodium phosphate and ammonium hydrogen phosphate, magnesium sulphate, slaked lime and clay. One or more of these substance can be added and mixed in a quantity of 1 to 15% by weight on the gross weight.

The case wherein the gun material of the present invention is gunned on the furnace wall of the surface temperature of more than 600° C. shall be explained in the following.

By the use of a well known dry gunning machine the gunning material gunned together with water produces a slurry according to the system comprising the fine powder or refractory, binding plasticizer and water. The covered and granulated material is united with the aggregate of refractory in said slurry and is adhered onto the furnace wall. After adhesion, the resin content in the covered and granulated material is spread into the matrix in a net form and then is carburized, and consequently a close structure of the carbon particle-carbon bond is formed.

In the prior gun material, in which the surface of refractory particle is covered with pitch or the pitch particle is added, the smoke emitting at the time of the gunning operation is much, the operation is difficult, the wetting of it with water is poor, the adhesive ratio is poor, a close structure is difficult to obtain and the life is about 20% in the residual percentage after the use of 10 charges.

The gunning material of the present invention, to the contrary, is compounded with the covered and granulated material in which the carbonaceous substance particle is covered and granulated with the fine powder of refractory so that the smoke emission at the time of gunning operation is nothing, the wetting of it with water is good and the covered and granulated material is united with the slurry. Also, a strong corrosion against the slag, molten pig iron, and molten steel is obtained due to the carbon particle-carbon bond structure.

The present invention is now concretely illustrated by the following examples in which the mixing proportions of various substances are in parts by weight or % by weight.

The quality of the carbonaceous substance particle which is used in the present invention is shown in Table 1.

TABLE 1

| Item | Carbonaceous substance particle | | | | |
| --- | --- | --- | --- | --- | --- |
| | I Coal | II Calcined coal coke (350° C.) | III Calcined petroleum coke (400° C.) | IV High softening pitch | V Coke* impregnated with pitch |
| Resin (%) | 18 | 9 | 8 | 35 | 10 |
| Carbon residue (%) | 76 | 84 | 92 | 65 | 90 |
| Ash (%) | 6 | 7 | — | — | — |

TABLE 1-continued

| Item | Carbonaceous substance particle | | | | |
|---|---|---|---|---|---|
| | I Coal | II Calcined coal coke (350° C.) | III Calcined petroleum coke (400° C.) | IV High softening pitch | V Coke* impregnated with pitch |
| Softening point (°C.) | — | — | — | 220 | — |

*Petroleum coke was impregnated with coal pitch having a softening point of 120° C.

The covered and granulated particle is obtained by rotating a sloped dish type vessel of a rotating type covering and granulating machine, charging of carbonaceous substance particle into the vessel, wetting the surface of the carbonaceous substance particle with a spraying supply of an aqueous solution of water soluble inorganic binder and then adding a fine refractory powder thereto.

By the above procedure, a covered and granulated particle is obtained with the mixing composition as shown in Table 2.

The covered and granulated particle is sieved so as to obtain a grain size of 1 to 6 mm after the drying of the particle for two hours at the temperature of 100° C.

TABLE 2

| Coated and granulated material | (1) | (2) | (3) | (4) | (5) | (6) | (7) |
|---|---|---|---|---|---|---|---|
| Particle of carbonaceous substance | I | II | I | II | IV | III | V |
| Inorganic water-soluble binder | Sodium silicate 50% aq. soln. | | | | | | |
| | Ammonium phosphate 30% aq. soln. | | | | | | |
| | $Al_2(OH)_2Cl_2 2H_2O$ 20% aq. soln. | | | | | | |
| | Phosphoric acid 80% aq. soln. | | | | | | |
| Fine powder of refractory (−0.149 mm) | Magnesia clinker | | | | | | |
| | Bauxite | | | | | | |
| | Silicon carbide | | | | | | |
| | Calcium hydroxide | | | | | | |
| Parts by weight of refractory fine powder to 100 parts by weight of carbonaceous substance | | 200 | 200 | 100 | 100 | 200 | 30 | 50 |
| Quantity of carbon residue in the coated and granulated material (%) | | 25 | 28 | 38 | 42 | 22 | 71 | 60 |

TABLE 3

| Item | | Product of present invention | | | Prior product |
|---|---|---|---|---|---|
| | | A | B | C | |
| Aggregate of refractories | Magnesia clinker 0.7–5 mm | 30 | 25 | 30 | 30 |
| | Natural dolomite clinker 0.7–5 mm | — | 10 | — | — |
| | Magnesia clinker −0.149 mm | 30 | 35 | 40 | 40 |
| Coated and granulated material | (1) 1–6 mm | 40 | — | — | — |
| | (5) 1–6 mm | — | 30 | — | — |
| | (6) 1–6 mm | — | — | 15 | — |
| | (7) 1–6 mm | — | — | 15 | — |
| Pitch coated particle 1–5 mm | | — | — | — | 30 |
| Binding plasticizer | Calcium hydroxide | — | 3 | — | 3 |
| | Elutriated clay | — | — | 5 | — |
| | $(NaPO_3)_{21}$ | — | 4 | — | 4 |
| | Sodium silicate $(Na_2O:SiO_2 = 1:3.22)$ | 4 | — | — | — |
| | Magnesium sulfate | — | — | 4 | — |
| Gunning temperature (°C.) | | 1200 | 900 | 1400 | 1200 |
| Gunning place | | Trunnion | Trunnion | Charging side | Trunnion |
| Adhesive ratio*1 (%) | | 90 | 95 | 100 | 80 |
| Smoke emitting quantity*2 | | Small | Small | Small | Much |
| Residual rate*3 (%) | | 30–40 | 40–50 | 70 | 20 |

*1 Eye measurement
*2 Eye measurement
*3 Residual ratio due to eye measurement after 10 charges

EXAMPLE 1

In a basic oxygen furnace having the capacity of 250 tons, the test of the gunning material which was the covered and granulated materials A, E, F and G is shown in Table 2.

The life of the prior carbon bond gunning material is 10 charges and about 20% remained, but the life of the gunning mix of the present invention was considerably increased. Also the smoke emission at the time of gunning was remarkably small, the performability was good and the adhesive rate was more than 90%.

The results obtained are shown in Table 3.

EXAMPLE 2

The product of the present invention was used for the hot repair gunning of a trough running molten pig iron. The hot repair gunning temperature was a temperature of 600° to 800° C. In the prior carbon bond gunning material, the smoke emitting at the time of gunning was remarkably large and as a result the use of it was impossible. In contrast thereto, the smoke emitting from the product of the present invention was little and also the life was 2 times as long than the prior product.

The results obtained are shown in Table 4.

TABLE 4

| Item | | Product of the present invention | | | | Prior product |
|---|---|---|---|---|---|---|
| | | D | E | F | G | |
| Aggregate of refractories | Silicon carbide 0.7–5 mm | — | — | — | 15 | 20 |
| | Bauxite 0.7–5 mm | 20 | 40 | — | — | 30 |
| | Mullite 0.7–5 mm | 10 | — | — | 25 | 10 |
| | Electromolten alumina −0.149 mm | 40 | 20 | 35 | 35 | 40 |
| | Silicon carbide −0.149 mm | — | 20 | — | — | — |
| Coated and granulated material | (2) 1–6 mm | 30 | — | — | — | — |
| | (3) 1–6 mm | — | 20 | 65 | — | — |
| | (4) 1–6 mm | — | — | — | 25 | — |
| Binding plasticizer | Elutricated clay | 5 | — | — | 5 | 5 |
| | Alumina cement | 4 | 10 | 15 | 3 | 4 |
| | $(NaPO_3)_{21}$ | — | — | — | 1 | 1 |
| Adhesive ratio*[1] (%) | | 90 | 90 | 95 | 90 | 80 |
| Gunning temperature (°C.) | | 800 | 600 | 700 | 400 | 800 |
| Smoke emitting quantity*[2] | | Small | Small | Small | Small | — |
| Residual rate*[3] (day) | | 8 | 10 | 7 | 10 | 4 |

*[1] Eye measurement
*[2] Eye measurement
*[3] Number of day wherein the gunning place was completely disappeared.

What we claim is:

1. A hot repair gun refractory mix comprising: (a) 5–70% by weight of a granulated material which includes a particulate carbonaceous substance having a particle size of 1 to 5 mm and containing 5 to 40% by weight of resin which is covered with a fine refractory powder by use of an water-soluble inorganic binder (b) 1 to 15% by weight of a binding plasticizer and (c) the remainder being refractory aggregate and fine powder.

2. A hot repair gun refractory mix comprising: (a) 5 to 70% by weight of a granulated material which includes a particulate carbonaceous substance selected from the group consisting of a petroleum or coal pitch particles having a high softening point and containing more than 60% by weight of carbon residue, a resin coated particle containing more than 60% by weight of fixed carbon, a calcined petroleum or coal coke particle and a resin impregnated coke particle, said particulate carbonaceous substance having a particle size of 1 to 5 mm and containing 5 to 40% by weight of resin, said particulate carbonaceous substance being covered with a fine refractory powder by use of a water-soluble inorganic binder; (b) 1 to 15% by weight of a binding plasticizer and (c) the remainder being refractory aggregate and fine powder.

3. A hot repair gun refractory mix of claim 1 wherein said particulate carbonaceous substance is a pitch particle having a melting point of 200° to 300° C. and the carbon residue thereof is more than 60% by weight.

4. A hot repair gun refractory mix of claim 1 wherein said particulate carbonaceous substance is a coal particle which contains more than 60% by weight of fixed carbon and 5 to 40% by weight of resin.

5. A hot repair gun refractory mix of claim 1 wherein said particulate carbonaceous substance particle is coke particle which is obtained by calcining at a temperature of 300° to 600° C. and which contains 5 to 20% by weight of resin.

6. A hot repair gun refractory mix of claim 1 wherein said particulate carbonaceous substance is coke particle impregnated with 5 to 20% by weight of pitch.

7. A hot repair gun refractory mix of claim 1 wherein said particulate carbonaceous substance is coke particle impregnated with 5 to 20% by weight of phenol resin.

8. A hot repair gun refractory mix of claim 1 wherein said fine refractory powder which covers said particulate carbonaceous substance of component (a) is selected from the group consisting of fine powders of magnesia, dolomite, alumina, mullite, silicon carbide and the recovery of disused refractory of dolomite, magnesia and high alumina refractories.

9. A hot repair gun refractory mix of claim 1 wherein the grain size of said fine refractory powder is less than 0.7 mm.

10. A hot repair gun refractory mix of claim 1 wherein said water soluble inorganic binder is selected from the group consisting of phosphoric acid, aluminium phosphate, ammonium phosphate, alkali metal phosphate, alkali metal silicate, ammonium borate, alkali metal borate, magnesium sulfate and aluminium chloride.

11. A hot repair gun refractory material of claim 1 wherein said refractory aggregate and said fine powder of component (c) are selected from the group consisting of magnesia clinker, dolomite clinker, alumina, mullite and mixtures thereof.

12. A hot repair gun refractory mix of claim 1 wherein the binding plasticizer of said component (b) is selected from the group consisting of sodium silicate powder, sodium phosphate, ammonium hydrogen phosphate, magnesium sulfate, slaked lime, clay and mixtures thereof.

* * * * *